(12) United States Patent
Fiore et al.

(10) Patent No.: US 7,158,076 B2
(45) Date of Patent: Jan. 2, 2007

(54) METHOD AND APPARATUS FOR CORRECTING VELOCITY-INDUCED RANGE ESTIMATE PHASE ERRORS IN A TWO-TONE MONOPULSE CW RADAR

(75) Inventors: Paul D. Fiore, Chelmsford, MA (US); Eric A. Rundquist, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 264 days.

(21) Appl. No.: 10/956,837

(22) Filed: Oct. 1, 2004

(65) Prior Publication Data

US 2006/0071847 A1  Apr. 6, 2006

(51) Int. Cl.
*G01S 13/42* (2006.01)
*G01S 7/40* (2006.01)
(52) U.S. Cl. .................. 342/129; 342/118; 342/174; 342/67
(58) Field of Classification Search .............. 342/129
See application file for complete search history.

(56) References Cited

U.S. PATENT DOCUMENTS

| 2,907,999 | A |   | 10/1959 | Wadley |
| 4,433,422 | A | * | 2/1984  | Kurth ........................ 375/226 |
| 4,797,677 | A | * | 1/1989  | MacDoran et al. ......... 342/352 |
| 5,402,129 | A |   | 3/1995  | Gelner et al. |
| 5,432,521 | A | * | 7/1995  | Siwiak et al. ............... 342/352 |

* cited by examiner

*Primary Examiner*—Thomas H. Tarcza
*Assistant Examiner*—Matthew M. Barker
(74) *Attorney, Agent, or Firm*—Daniel J. Long; Robert K. Tendler

(57) ABSTRACT

A method and apparatus is provided for correcting the phase difference estimate derived from a two-tone CW radar to correct velocity-induced range estimate phase errors by offsetting the phase difference estimate with a phase correction equal to either of the Doppler frequencies associated with returns from an object multiplied by the time interval between the samplings of the returned waveforms. The correction effectively eliminates the velocity-induced slippage between the phases of the retuned waveforms so that a comparison between the phases of the waveforms can be made to reduce or substantially eliminate range estimate bias.

20 Claims, 5 Drawing Sheets

US 7,158,076 B2

METHOD AND APPARATUS FOR CORRECTING VELOCITY-INDUCED RANGE ESTIMATE PHASE ERRORS IN A TWO-TONE MONOPULSE CW RADAR

FIELD OF THE INVENTION

This invention relates to two-tone CW radars and more particularly to a method for correcting velocity-induced range estimate phase errors.

BACKGROUND OF THE INVENTION

As discussed in a patent application Ser. No. 10/956643 entitled Method and Apparatus for Improved Determination of Range and Angle of Arrival Utilizing a Two-tone CW Radar by Paul D. Fiore, filed on even date herewith, assigned to the assignee hereof and incorporated herein by reference, a system is provided for providing range and angle of arrival estimates from the output of a two-tone CW radar. In this system, the range of an object from the radar is computed from the phase angle between returns from the object in which the phase of the Doppler return of one tone is compared with the phase of the Doppler return of the second tone.

This system uses a two-tone CW radar in which the two tones are sequentially projected or propagated towards a target. In one embodiment the switching rate between the two tones is on the order of 100 KHz, which corresponds to 5 milliseconds of the $f_1$ tone followed by 5 milliseconds of the $f_2$ tone.

When used for a fire control system to detect the range of a moving target, the system works relatively well for slow targets. However, when the target's speed approaches 300 meters per second, as in the case with rocket-propelled grenades, range estimates degrade significantly.

While initially a plurality of causes was investigated to ascertain the cause of the range error, it was noticed that the Doppler frequency associated with the 300 m/sec. target was about 49 KHz. This was found to be quite close to the 50 KHz Nyquist rate associated with the 100 KHz switching. The result with uncompensated systems was wide swings in the range estimate for incoming targets, whether the target was a rocket-propelled grenade, a projectile or a missile.

By way of background, the theory of two-tone continuous wave range estimation radar shows that target range is proportional to the difference in the complex phase angle between the signal returns corresponding to the two tones. In the above-mentioned sequential transmission of tones, known as a diplexing method, the two tones are transmitted sequentially, and it was assumed that the target Doppler frequency was small compared to the switching rate. With this assumption, an acceptably small bias in the range estimate results. However, it was found that the bias rate increases as the target speed increases, thus limiting the ability to accurately obtain the range of high-speed targets.

For a radar to measure range, it is typically thought that some sort of amplitude or phase modulation of the carrier is required. However, as mentioned above there is a method using more than one CW signal that can in fact provide range, which involves a tellurometer and is available for geodetic survey work. The geodetic system makes use of the fact that the survey equipment is not moving and therefore has a zero Doppler shift.

Radar designs for the case where there is target velocity and it is low can produce desired range estimates when using two-tone CW-transmitted signals. Additionally, approaching or receding targets can be distinguished through proper choice of CW frequencies.

Thus, those two-tone CW radars provide accurate range measurements if the motion during one Doppler period is small. This means that the phases of the wave forms will not appreciably "slip" relative to each other and a comparison between the phases of the wave forms can be made.

SUMMARY OF INVENTION

It has now been found that one can correct the measured phase difference in the Doppler-shifted returns from high-speed targets to eliminate the range estimate bias by providing an offset or correction that is applied to the measured phase difference. This correction has been found to be the Doppler frequency of either tone times the time difference between samples. This offset has been found to be linearly related to the target velocity and the time delay between the samplings for the two tones. Since it is a relatively simple matter to ascertain the time at which samples are collected for each of the two wave forms, one can derive a phase correction that is simply the frequency of one of the tones times the time difference between the samples.

By correcting the phase difference originally calculated from the two-tone CW radar returns with this phase correction, the so-called slippage between the two waveforms due to the speed of the target is canceled. The result is a range estimate that is correct, independent of the speed of the approaching target.

In summary, a method and apparatus is provided for correcting the phase difference estimate derived from a two-tone CW radar to correct velocity-induced range estimate phase errors by offsetting the phase difference estimate with a phase correction equal to either of the Doppler frequencies associated with returns from an object multiplied by the time interval between the samplings of the returned waveforms. The correction effectively eliminates the velocity-induced slippage between the phases of the returned waveforms so that a comparison between the phases of the waveforms can be made to reduce or substantially eliminate range estimate bias.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
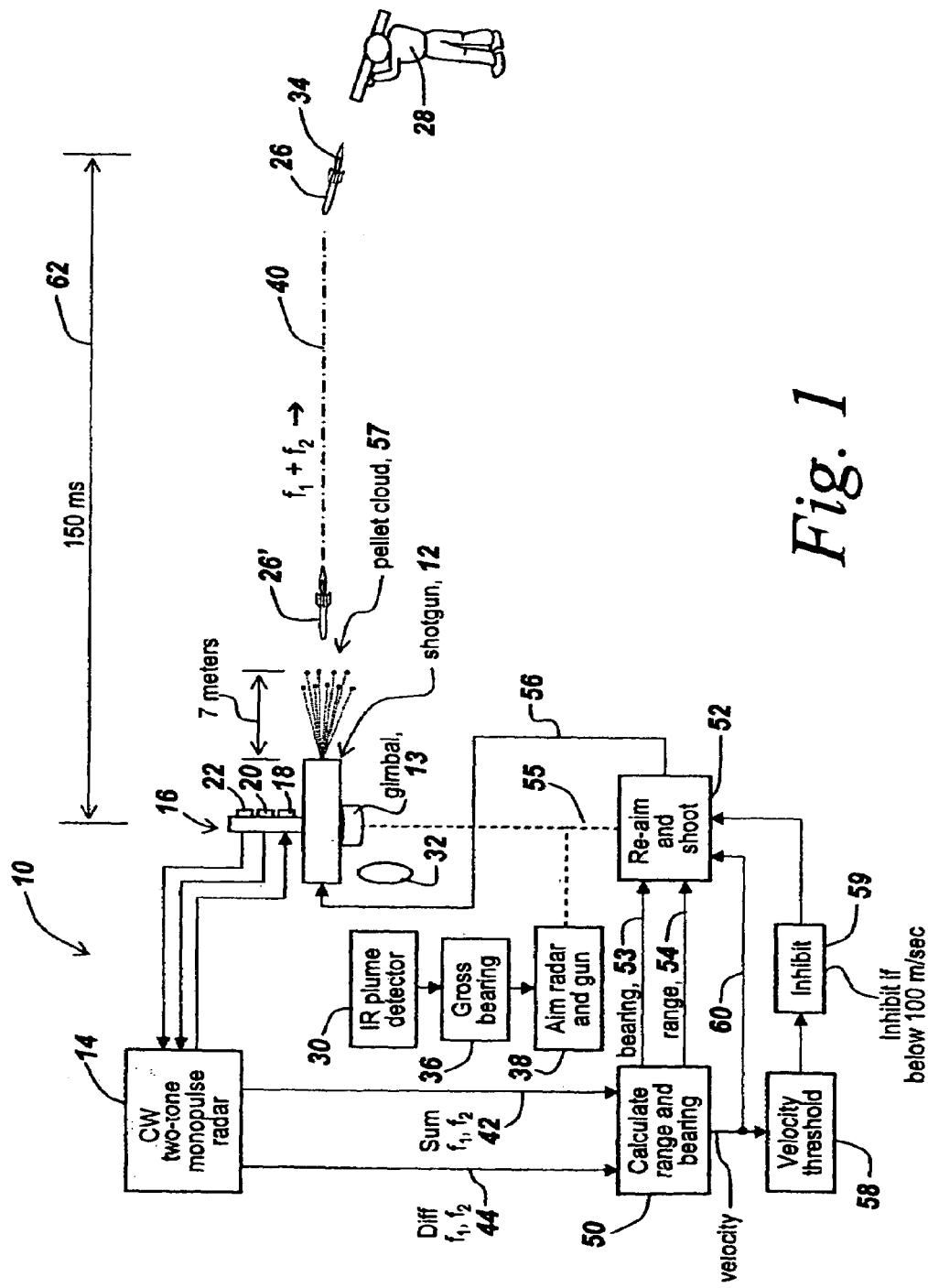
FIG. 1 is a block diagram of a multiple-barrel shotgun-type countermeasure system that has its firing command based on the range of an incoming rocket-propelled grenade or RPG.

Referring now to FIG. 1, in one application of the subject invention, a fire control system 10 for a shotgun 12 mounted on a gimbal 13 is provided by using an Ka-band CW two-tone monopulse radar 14 coupled to a planar antenna 16, which carries a transmit element 18 and two receive elements 20 and 22 from which are derived sum and difference signals related to returns from, for instance, a high-velocity rocket-propelled grenade 26 fired by an individual 28.

In order to provide an initial gross aiming of gun 12, the plume 34 from rocket-propelled grenade 26 is detected by the plume imaged by a lens system 32 onto an IR plume detector 30 that provides a gross bearing at unit 36 used at unit 38 to initially aim the radar and gun.

Radar returns from the target result in the generation of Sum $f_1$ and Sum $f_2$ signals 42 and Diff. $f_1$ and Diff. $f_2$ signals 44 that are coupled to a unit 50 that calculates range and bearing used by a re-aim and shoot module 52. Unit 50 provides bearing 53, range 54 and velocity 60 to unit 52, from which gimbal 13 is actuated to re-aim gun 12 in accordance with the more refined bearing range and velocity estimates from unit 50.

At an appropriate range, a pellet cloud 57 is projected towards RPG 26 so that as the RPG arrives at position 26', it meets with an optimal pellet pattern. The firing signal for the gun is critical so that the pellet cloud meets the RPG at the correct range for establishing an optimal pellet cloud density to effect a kill.

In one embodiment, this range is seven meters so that given the cone of the pellet cloud, its density will be optimal as it impacts the rocket-propelled grenade.

It should be noted that the entire time that is allocated for the aiming and firing sequence is less than 150 milliseconds as illustrated by line 62, which is from the time that the RPG is launched to the time that it arrives at its intended target.

Note that, in one embodiment, if the target velocity is below that which is associated with a moving projectile, then a velocity threshold unit 58 coupled to an inhibit unit 59 cancels the re-aiming and shooting process if, for instance, the detected velocity is detected below 100 meters per second.

Figure 2:
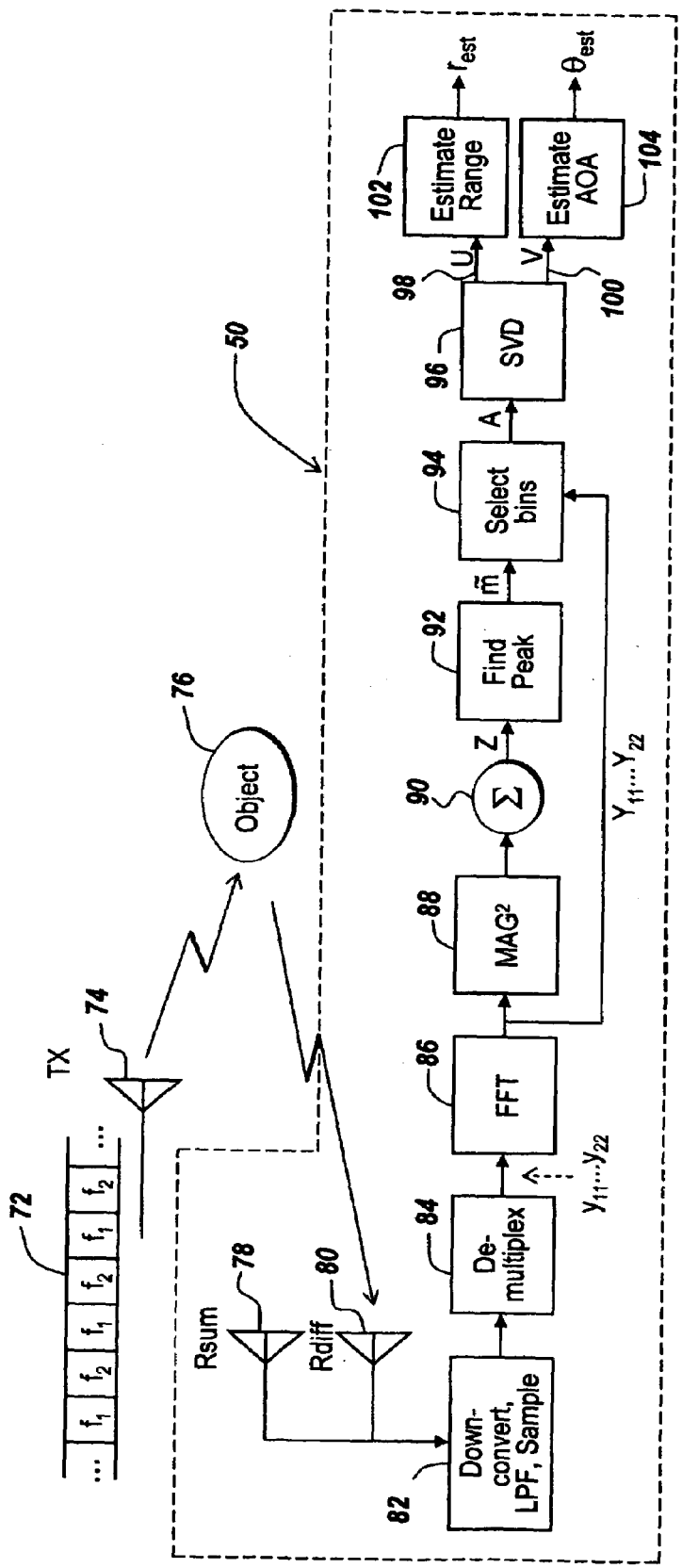
FIG. 2 is a block diagram of a two-tone CW monopulse radar in which sequential two tones are projected towards an object and in which the sum and difference Doppler returns from the object are analyzed to provide a range estimate.

Referring to FIG. 2, in one embodiment of the range and bearing calculation unit 50 a sequence of two tones, here illustrated at 72, is propagated or projected by a transmit antenna 74 towards an object 76, with returns from the object being detected by receive antennas 78 and 80 to generate respective sum and difference signals coupled to unit 50. The choice of the difference of frequencies depends on the range ambiguity that is acceptable. Typically, one uses a difference of between 500 kHz and 1.5 MHz. In one embodiment, a typical set of frequencies is 24.7290 GHz and 24.7300 GHz, a difference of 1.0 MHz. Here in one embodiment the sum and difference signals are processed by a down-convert, low-pass filter and sampling unit 82, the output of which is coupled to a demultiplexing unit 84 and a Fast Fourier transform module 86, in turn coupled to a magnitude-square module 88, which makes available the magnitude-squared amplitudes of the FFT bins. Thus the digital time domain data stream $y_{11} \ldots y_{22}$ is converted by FFT module 86 to frequency domain data stream $Y_{11} \ldots Y_{22}$ in terms of frequency bins, with the magnitude-squared output of module 88 accumulated at 90 so as to permit the finding of a peak by peak detection unit 92, from which the particular bin having the target is selected as shown at 94.

Having selected the frequency bin most likely to contain the target, a two-by-to matrix A is formed from the sum and difference signals associated with this frequency bin, with the sum and difference signal matrix A being coupled to a singular value decomposition processor 96 that outputs a two-by-two matrix U, here illustrated by reference character 98 from which range can be estimated and a two-by-two matrix V, here illustrated by reference character 100 from which angle of arrival can be derived.

The two-by-two matrix U is applied to a range estimation unit 102 from which a range estimate is made.

The range estimate comes from analyzing the first column of the two-by-two matrix U, which when processed provides the aforementioned phase angle between the two tones.

Note that matrix V is applied to an angle of arrival estimator 104.

Figure 3:
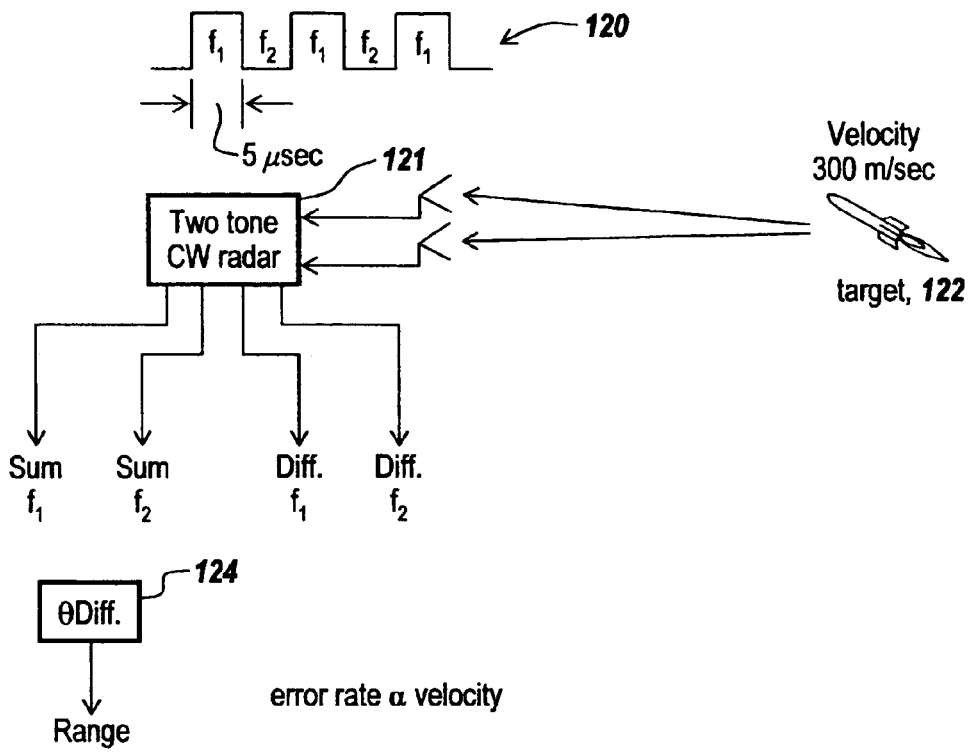
FIG. 3 is a block diagram of a simplified version of the two-tone CW radar of FIG. 2, illustrating that the phase difference between the Sum channels of the two tones can be used in obtaining the phase difference, from which range can be determined.

Referring now to FIG. 3, to summarize what is happening in the system of FIG. 2, two tones are alternately generated as illustrated at 120, with a five-microsecond duration for each of the tones. The switching time between going from frequency $f_1$ to frequency $f_2$ or vice versa is negligible. The switching rate is thus determined by the 5 μ/sec. pulse durations. The two-tone radar 121 projects a beam with two tones towards object 122, which may have a velocity, for instance of 300 meters per second. Sum $f_1$ and Sum $f_2$ signals are developed by radar 121, which are used at 124 to determine range in terms of their phase difference.

As mentioned hereinbefore, the range error rate is proportional to velocity.

Figure 4:
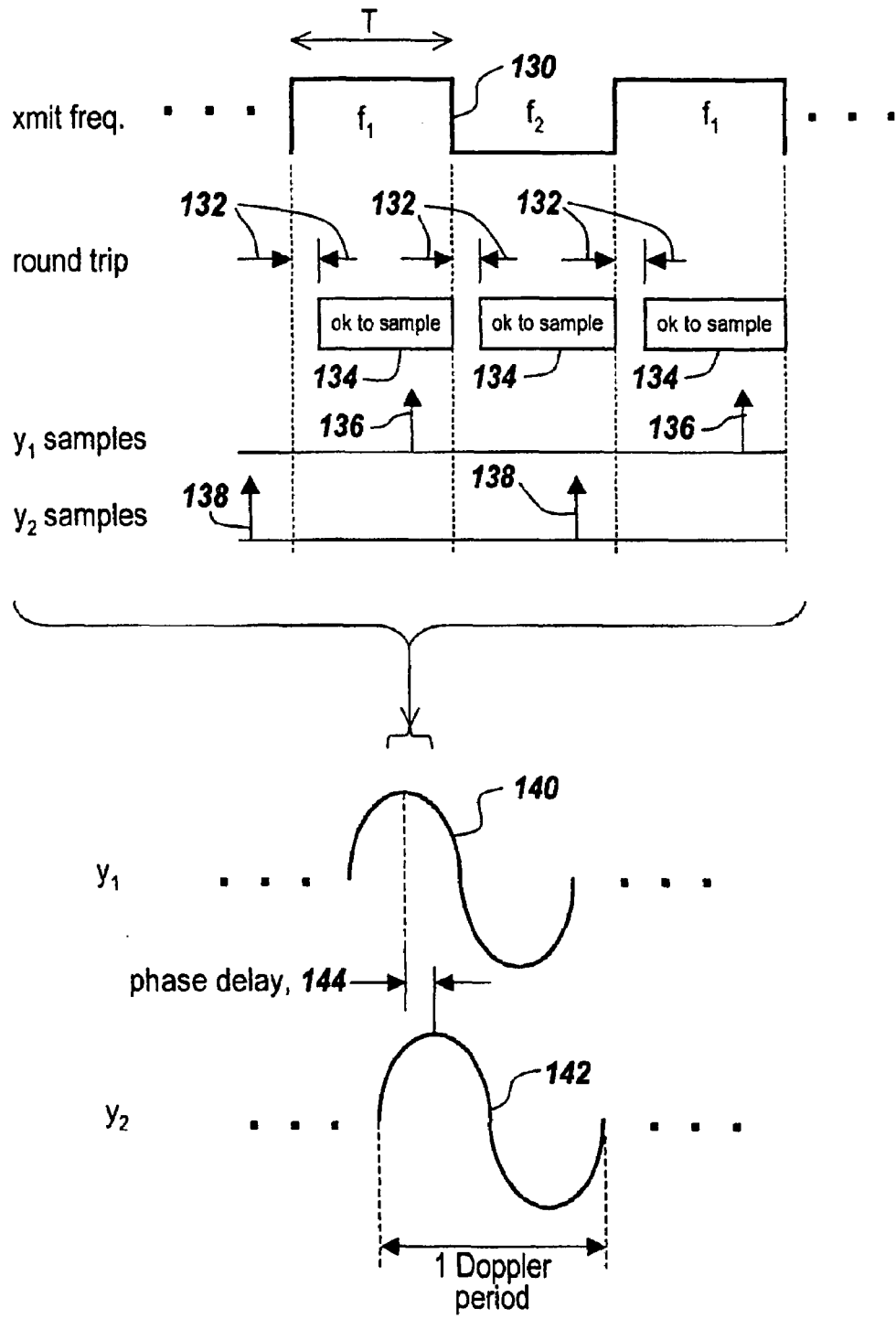
FIG. 4 is a waveform diagram illustrating the time intervals at which the two tones of the radar of FIG. 1 are transmitted, the time at which samples are taken, and the phase delay between the samples of the wave forms from which range can be estimated.

Referring to FIG. 4, the transmitted tones are as shown by waveform 130, which has a period T. The round trip travel time from which no samples are allowed is indicated by double-ended arrows 132. This leaves a time interval 134 in which it is appropriate to take samples. Samples are taken of the returns as illustrated at 136 and 138, with waveforms 140 and 142 respectively defining the wave forms of the two tone returns at Doppler frequencies $f_1$ and $f_2$. It will be appreciated that what is measured is the phase delay 144 between waveforms 140 and 142 to be able to determine range, with the phase delay being from the samples $y_1$ and $y_2$.

Figure 5:
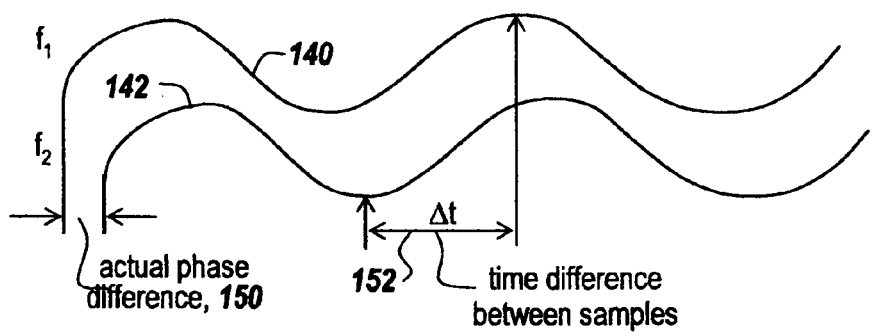
FIG. 5 is a waveform diagram illustrating that for the two frequencies or tones of FIG. 4, the time difference between samples results in a phase angle correction that is equal to either one of the two Doppler frequencies times the time difference between the samples.

As illustrated in FIG. 5, the actual phase difference between waveforms 140 and 142 corresponding to $f_1$ and $f_2$ respectively is illustrated by double-ended arrows 150, whereas the time difference between the samples, ΔT, is illustrated by double-ended arrow 152.

It will be shown that the appropriate phase correction or offset that may be applied to the phase difference calculation at 124 is equal to either one of the two Doppler frequencies multiplexed by ΔT, the time difference between the samples.

Why this simple phase correction works will be discussed hereinafter. However, it is a finding of the subject invention that by simply knowing the time difference between the samples and knowing the Doppler frequency of the target, one can offset the phase difference provided by the two-tone CW radar and by this offset to be able to eliminate the effects of slippage between the $f_1$ and $f_2$ waveforms due to the velocity of the incoming target.

Figure 6:
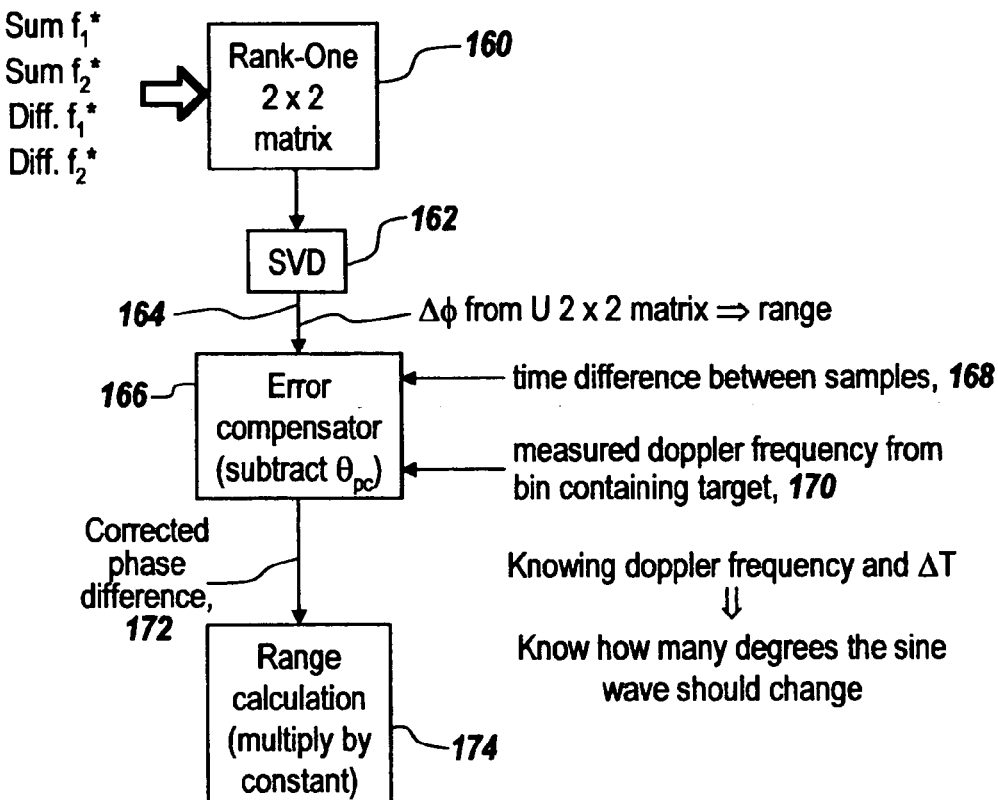
FIG. 6 is a block diagram showing the phase difference measurement from the output of a singular value decomposition of a Rank One two-by-two matrix used to provide a range estimate that is corrected by an offset that offsets the phase difference measurement with the offset of FIG. 5, with the result being a corrected phase difference measurement applied to a range calculator; and, FIG. 7 is a block diagram of the operation of the error compensator of FIG. 6, illustrating the calculation of the phase error between two complex numbers followed by calculation and application of a base correction factor, such that the phase difference between the two complex numbers is offset by the appropriate correction to cancel out the effect of slippage.

Referring now to FIG. 6, in one embodiment of the subject invention, the aforementioned Rank One two-by-two matrix 160 is formed by the sum and difference signals associated with this frequency bin having the target. Here, Sum $f_1^*$ and Sum $f_2^*$ refer to the Sum $f_1$ and Sum $f_2$ signals that have been established as being from the target. Matrix 160 is applied to a singular value decomposition unit 162 from which the phase difference φ is available on line 164. This is the phase difference that is calculated from the first row of Matrix U above, which is one of the results of the singular value decomposition.

Having derived Δφ from the output of singular value decomposition unit 162, an offset is applied at unit 166, which provides an error compensation that offsets Δφ. This error compensation unit is provided with the time difference between samples as illustrated on line 168 and the measured Doppler frequency containing the target on line 170, such that knowing the Doppler frequency and the time difference between samples, one can calculate how many degrees the sine wave should be changed to eliminate slippage.

The corrected phase difference is available on line 172, coupled to a range calculation unit 174 that multiplies the corrected phase difference by a constant to obtain range.

Figure 7:
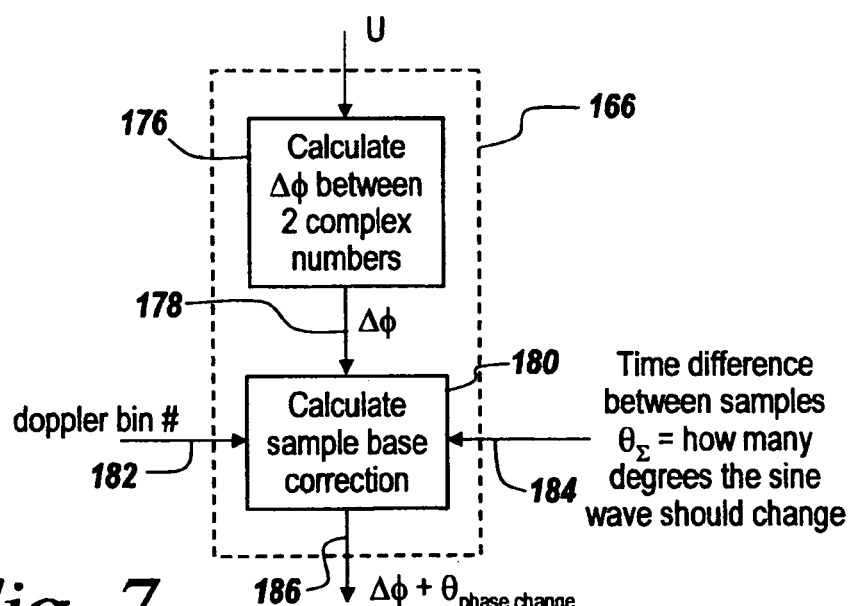

Referring now to FIG. 7, error compensation unit 166 is provided with a unit 176 to which is applied the two-by-two matrix U. This unit calculates the phase difference between two complex numbers in the first column of this matrix, with the output being the phase difference on line 178. This phase difference is applied to a calculator 180, which applies a base correction knowing the Doppler bin number on line 182, thereby establishing the Doppler frequency of the target. The time difference between samples is applied on line 184, with the phase-corrected signal being outputted on line 186. This signal is the original calculated phase Δφ offset by the phase change $θ_{pc}=f_1 \times T$ such that $θ_{pc}$ defines how many degrees the sine wave should change in order to correct the measurement.

Theory of Operation

The theory of two-tone continuous-wave range estimation shows that target range is proportional to the difference in complex phase angle between the signal returns corresponding to the two tones. In the prior art, the two tones are transmitted sequentially, and it was assumed that the target Doppler frequency was small compared to the switching rate. With this assumption, an acceptably small bias in the range estimate resulted. However, as noted above, the bias increases as target speed increases, thus limiting the prior art to low speed targets.

The subject invention provides a method to correct the estimated phase difference for high speed targets, thereby eliminating the range estimate bias. The correction is related linearly to the target velocity and the time delay between the sampling instants for the two tones.

As noted above, a tellurometer is available for geodetic survey work, and makes use of the fact that the survey equipment is not moving (i.e., zero Doppler shift). As has been discussed, the utilization of multiple CW transmitted signals can produce the range estimates for moving targets, assuming the target velocity is low.

How this is accomplished is as follows: to simplify the description, first assume that the two different frequencies $f_k$, for k=1, 2 are simultaneously transmitted. Without loss of generality, it can be assumed that the transmitted signals are of the form $$s_k(t)=\cos(\omega_k t+\psi_k), \quad (1)$$

where $\psi_k$ is an unknown phase angle, and $\omega_k=2\pi f_k$. Assume that a target has a range that varies with time as r(t)=r−vt, where r is the initial range (in meters) and v the radial velocity magnitude (in meters/sec). A positive v corresponds to a closing target. The received signals are given by $$x_k(t) = 2\alpha s_k\left(t - \frac{2r(t)}{c}\right) \quad (2)$$

$$= 2\alpha s_k\left(\left(1 + \frac{2v}{c}\right)t - \frac{2r}{c}\right)$$

$$= 2\alpha \cos\left(\omega_k\left(1 + \frac{2v}{c}\right)t - \frac{2\omega_k r}{c} + \psi_k\right),$$

where 2α is some unknown attenuation factor, and c is the speed of light. After multiplication by the transmitted waveform and low pass filtering, the signal becomes $$y_k(t) = \alpha \cos\left(\frac{2\omega_k v}{c}t - \frac{2\omega_k r}{c}\right), \quad (3)$$

where use has been made of the formula cos(a) cos(b)=½ cos(a−b)+½ cos(a+b). If the frequencies $f_k$ are close to each other, the periods of the waveforms in Equation 3 will be very close. Additionally, if the motion during one Doppler period is small, the phases of waveforms will not appreciably "slip" relative to each other. Thus, a comparison between the phases of the waveforms may be made. Note that in the development above, if α had in fact been associated with a complex attenuation, i.e. a phase shift, then this error is common to both phases and is therefore cancelled out when the phase difference is calculated.

To perform the phase comparison, one measures $y_k(t)$ for a period of time and then takes the Fourier transform, often implemented as a fast Fourier transform (FFT), thereby obtaining integration gain against noise. The phase of the transform for the FFT bin corresponding to $\omega_k$ is given by $$\phi_k = \frac{-2\omega_k r}{c} mod 2\pi. \quad (4)$$

The difference in Fourier phase is $$\phi_2 - \phi_1 = \frac{-2(\omega_2 - \omega_1)r}{c} mod 2\pi \quad (5)$$

$$\Delta_\phi = \frac{-4\pi\Delta_f r}{c} mod 2\pi.$$

where

-continued $$\Delta_\phi \stackrel{\Delta}{=} \phi_2 - \phi_1 \quad (6)$$

and $\Delta_f \stackrel{\Delta}{=} f_2 - f_1$.

To obtain an estimate for r, assuming $r<c/(2\Delta_f)$ one obtains $$0 \leq \frac{4\pi\Delta_f r}{c} < 2\pi, \quad (7)$$

$$0 \leq |\Delta_\phi| < 2\pi. \quad (8)$$

Therefore, with the restriction $r<c/(2\Delta_f)$, the phase difference is unambiguous, and one can solve for the range via $$r_{est} = \frac{c|\Delta_\phi|}{4\pi\Delta_f}. \quad (9)$$

The above description assumed simultaneous transmission of the two frequencies. Alternatively, the subject system uses a diplexing method, in which the frequencies are transmitted sequentially in a time multiplexed fashion. Note that the two received waveforms must be sampled synchronously to the change in transmit frequencies. Also, sufficient time must be allowed between the change in frequency and the sampling time so that the signal can propagate to the target and back.

It is assumed in the prior art that the Doppler frequencies $\omega_d = 2\omega_k v/c$ (in radians) are small compared to the sampling rate. If this situation does not hold, then the resulting range error bias grows unacceptably large.

With this as background, the subject invention discusses the application of the diplexing method to a system in which the Doppler frequencies can be much larger, up to the Nyquist frequency of the switching and sampling rate.

Let $f_k$ for k=1,2 denote each of the two frequencies used (in Hz). Let l=1,2 index the sum and difference channels (l=1 is the sum channel, l=2 is the difference channel).

For all channels l=1,2 and for all frequencies k=1,2 let the time domain data samples be represented by $y_{kl}(n)$, n=1, . . . , N. The data stream for each frequency/channel combination is sampled at a rate of $f_s$ Hz and is transformed via a conventional windowed FFT $$Y_{kl}(m) = \sum_{n=0}^{N-1} w(n) y_{kl}(n) e^{-j2\pi mn/N}, \quad (10)$$

$$k = 1, 2 \; l = 1, 2 \; m = -N/2, \ldots, N/2 - 1,$$

where w(n) is a window function. Alternatively, using well-known methods, a heavily zero-padded FFT may be used to give refined results in the processing to follow. Additionally, other well-known interpolation methods can be employed to further refine the results in the processing to follow.

Next, the magnitude squared results of the FFTs are calculated and the results accumulated to obtain $$Z(m) = \sum_{k=1}^{2} \sum_{l=1}^{2} |Y_{kl}(m)|^2, \quad m = -N/2, \ldots, N/2 - 1. \quad (11)$$

The peak bin $\hat{m}$ of Z, such that $Z(\hat{m}) \geq Z(m)$ is determined via a simple peak search. As is well known, the peak search is generally performed only over frequency regions where target returns can occur as determined by system design and target dynamics. Optionally, a refined peak may be calculated and used in the processing to follow. There are many well known methods to calculate refined peaks, such as a parabolic interpolation approach. For the present purposes the peak frequency is referred to as bin $\hat{m}$. The Doppler frequency in Hz is determined as $$f_d = \omega_d / (2\pi) \quad (12)$$

$$= \frac{\hat{m}}{N} f_s.$$

In Equations 10 and 11, the frequency bin index m is centered around zero so that both approaching targets, positive Doppler, and receding targets, negative Doppler, can be properly phase corrected. From Equation 3 one sees that since the signals input to the FFT are real, the FFT output is conjugate symmetric, and thus an approach/recede ambiguity is present. As described in Equation 3, a method for resolving this ambiguity is to properly choose the transmitter frequencies so that the target range satisfies $r<c/(2\Delta_f)$. Thus, the correct sign for the velocity can be determined, thereby determining the correct sign of $\hat{m}$.

With the peak FFT bin and the corresponding Doppler frequencies identified, we now come to the central idea of the subject invention. If the samples of the two frequencies are spaced apart by an amount of time T, equal to one-half of the sample period of the data streams corresponding to the two frequencies which are each sampled at a rate of $f_s$ Hz, during this time period T, the target has moved a distance of vT. This results in a relative phase shift between the two data streams. This previously unaccounted-for phase shift can be determined by substituting T for t in the first term inside the cosine bracket in Equation 3:

$$\Delta_c = \frac{2\omega vT}{c}. \quad (13)$$

where $\omega$ can be taken as either $\omega_1$ or $\omega_2$, since the difference $\omega_2 - \omega_1$ is small relative to c.

Since the Doppler frequency is 107 $_d$=2$\omega$v/c (in radians), one has $$\Delta_c = \frac{2\omega vT}{c} \quad (14)$$

$$= \omega_d T$$

$$= 2\pi f_d T$$

$$= 2\pi T \frac{\hat{m}}{N} f_s$$

$$= 2\pi (1/(2f_s)) \frac{\hat{m}}{N} f_s$$

-continued $$= \frac{\pi \tilde{m}}{N}$$

The result is that $$\Delta'_\phi \overset{\Delta}{=} \Delta_\phi + \frac{\pi \tilde{m}}{N} \quad (15)$$

is the corrected phase that is used to estimate the range in $$r_{est} = \frac{c|\Delta'_\phi|}{4\pi \Delta_f}. \quad (16)$$

In the subject system, the two frequencies $f_1$ and $f_2$ are time-multiplexed fashion by the transmitter. The transmitted signal reflects off the object of interest, and is received by sum and difference channels, Rsum and Rdiff. Typical radar functions such as down conversion, low pass filtering and analog-to-digital converter (ADC) sampling are performed. Next, a demultiplexing operation is performed. This produces the time-domain data streams $y_{11}(n), \ldots, y_{22}(n)$. Individual FFTs are performed according to Equation 10 to produce the frequency-domain data streams $Y_{11}(m), \ldots, Y_{22}(m)$. The squared magnitude of the FFT bins are then accumulated according to Equation 11 to produce $Z(m)$, which is then peak searched to produce the index $\tilde{m}$ for the largest peak. This index is used to retrieve the corresponding bins $Y_{11}(\tilde{m}), \ldots, Y_{22}(\tilde{m})$.

There are several approaches to processing these bins to derive the Fourier phase difference $\phi_2 - \phi_1$. One simple (but suboptimal approach) is to calculate $$\phi_k = \text{angle}(Y_{k1}(\tilde{m})), k=1, 2 \quad (17)$$

and then $\Delta_\phi$ via Equation 6. A better approach is to optimally combine $Y_{11}(\tilde{m}), \ldots, Y_{22}(\tilde{m})$ and directly produce $\Delta_{100}$. In either case, $\Delta'_\phi$ is next calculated using Equation 15. Finally, the range is estimated using Equation 16.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for correcting velocity-induced range estimate errors from a two-tone CW radar which provides as an output the phase difference between Doppler-shifted returns from a moving object, comprising the steps of:
    offsetting the phase difference with a correction equal to the Doppler-shifted frequency of one of the two-tone returns times the time interval between waveform samples; and,
    deriving range from the offset phase difference.

2. The method of claim 1, wherein the two tones are sequentially generated with a predetermined switching rate, and wherein the Doppler-shifted waveforms corresponding to the returns from the object are sequentially sampled with a predetermined time interval establishing the time interval between waveform samples.

3. The method of claim 2, wherein the length of a tone establishes a Nyquist switching rate.

4. The method of claim 3, wherein the velocity of the object exceeds 100 meters/second.

5. The method of claim 3, wherein the velocity of the object has an associated frequency that approaches the Nyquist switching rate.

6. The method of claim 5, wherein the velocity of the object has an associated frequency within 10 KHz of the Nyquist switching rate.

7. A method for improving the range accuracy for the range of a rapidly moving object derived from a two-tone CW radar from which sum and difference signals for the two frequencies associated with the two tones are available, comprising the steps of:
    forming a first two-by-two matrix from the sum and difference signals for each of the two frequencies associated with the two tones;
    factoring the first two-by-two matrix into a second matrix associated with range; and,
    determining range from the second two-by-two matrix by deriving the phase difference between Doppler-shifted waveforms corresponding to returns from the moving object and offsetting derived phase difference by a quantity equal to the Doppler-shifted frequency of one of the two-tone returns times the time interval between waveform samples.

8. The method of claim 7, wherein the first two-by-two matrix is a Rank One matrix in the absence of noise.

9. The method of claim 7, wherein the factoring step includes the step of performing a singular value decomposition.

10. The method of claim 7, wherein the range determining step includes the step of determining the phase between the complex numbers in the first column of the second matrix.

11. The method of claim 7, wherein the two tones are sequentially generated with a predetermined switching rate, and wherein the Doppler-shifted waveforms corresponding to the returns from the object are sequentially sampled with a predetermined time interval establishing the time interval between waveform samples.

12. The method of claim 11, wherein the length of a tone is 5 microseconds, thus to establish a Nyquist switching rate of 50 KHz.

13. The method of claim 12, wherein the velocity of the object exceeds 100 meters/second.

14. The method of claim 12, wherein the velocity of the object has an associated frequency that approaches the Nyquist switching rate.

15. The method of claim 14, wherein the velocity of the object has an associated frequency within 10 KHz of the Nyquist switching rate.

16. In a system for countermeasuring a rocket-propelled grenade using a multiple-barrel gun that projects a pattern of shot towards an incoming rocket-propelled grenade, a method for improving the aiming and firing accuracy of the gun, comprising the step of:
    using a two-tone monopulse CW radar that develops sum and difference signals for deriving the range of said rocket-propelled grenade relative to the radar; the step of deriving the range of the incoming rocket-propelled grenade including the steps of:

forming a first two-by-two matrix from the sum and difference signals for each of the two frequencies associated with the two tones;

factoring the first two-by-two matrix into a second matrix associated with range;

determining range from the second two-by-two matrix by deriving the phase difference between Doppler-shifted waveforms corresponding to returns from the moving object and offsetting derived phase difference by a quantity equal to the Doppler-shifted frequency of one of the two-tone returns times the time interval between waveform samples; and, aiming and firing the gun based on the range measurement from the radar.

17. The method of claim 16, wherein the first two-by-two matrix is a Rank One matrix in the absence of noise.

18. The method of claim 16, wherein the factoring step includes the step of performing a singular value decomposition.

19. The method of claim 16, wherein the range determining step includes the step of determining the phase between the complex numbers in the first column of the second matrix.

20. A system for improving the range estimate of a target moving relative to a two-tone CW radar from which sum and difference signals for the two frequencies associated with the two tones are available, in which the two tones are sequentially generated and in which the Doppler-shifted waveforms corresponding to the two-tone returns from said target are sequentially sampled, comprising:

a down converter for down-converting, low pass filtering and sampling said sum and difference signals;

a demultiplexer for providing time domain data streams corresponding to the down-converted, low pass filtered and sampled sum and difference signals;

a module coupled to said demultiplexer for performing a Fast Fourier Transform on said time-domain data stream to produce associated frequency domain data streams in the form of individual frequency bins;

a calculator for squaring the magnitude of the individual bins to produce magnitude-squared values;

an accumulator for accumulating said magnitude-squared values;

a peak search detector for determining from the accumulated magnitude-squared values which of said frequency bins has the highest peak, thus to determine which of said frequency bins contains said target;

a process or for generating a first two-by-two matrix from the sum and difference values associated with the bin that is determined to contain said target;

a unit for performing a singular value decomposition of said first two-by-two matrix so as to factor said first matrix into a second and third matrix respectively related to range and angle of arrival;

a phase detector for detecting the phase difference between the complex numbers in the first column of said second matrix, thus to derive range; and, a phase correction module for offsetting said phase difference by a quantity equaling the Doppler-shifted frequency of one of the two-tone returns from said target multiplied by the time interval between successive samplings of the waveforms associated with said two-tone returns.

* * * * *